United States Patent [19]
Midden

[11] Patent Number: 5,201,474
[45] Date of Patent: Apr. 13, 1993

[54] COFFEE GRINDER

[75] Inventor: William E. Midden, Springfield, Ill.

[73] Assignee: Bunn-O-Matic Corporation, Springfield, Ill.

[21] Appl. No.: 562,757

[22] Filed: Aug. 3, 1990

[51] Int. Cl.⁵ .............................................. B02C 19/00
[52] U.S. Cl. ................................. 241/100; 241/101.4; 241/246; 241/258; 241/259.1
[58] Field of Search ..................... 241/100, 101.4, 246, 241/248, 258, 259.1, 261.2, 261.3

[56] References Cited

U.S. PATENT DOCUMENTS

| | | | |
|---|---|---|---|
| 2,852,202 | 9/1958 | Ditting et al. | 241/100 X |
| 2,900,140 | 8/1959 | Schuhmann et al. | 241/100 X |
| 3,610,540 | 10/1971 | Kropp et al. | 241/13 X |
| 4,023,737 | 5/1977 | Leider et al. | 241/261.3 |
| 4,039,153 | 8/1977 | Hoffman | 24/261.2 X |
| 4,605,175 | 8/1986 | Weber | 241/261.2 X |
| 4,607,622 | 8/1986 | Zimmerman | 241/33 X |
| 4,650,128 | 3/1987 | Goldhammer | 241/36 |
| 4,813,622 | 3/1989 | Nidiffer et al. | 241/100 |

FOREIGN PATENT DOCUMENTS

| | | | |
|---|---|---|---|
| 501028 | 2/1951 | Belgium | 241/246 |
| 2444152 | 3/1976 | Fed. Rep. of Germany | 241/261.2 |
| 1165865 | 10/1958 | France | 241/246 |
| 1306775 | 2/1973 | United Kingdom | 241/261.2 |

Primary Examiner—Mark Rosenbaum
Assistant Examiner—Frances Chin
Attorney, Agent, or Firm—Trexler, Bushnell, Giangiorgi & Blackstone

[57] ABSTRACT

A coffee grinder comprises a bin for holding a supply of coffee beans to be ground, a grinding assembly for receiving beans from the bin and grinding the same to a desired grind size, and a collection receptacle for receiving the ground coffee from the grinding assembly. The grinding assembly comprises blades for cutting the beans to a relatively uniform size, which blades are configured and located for feeding the cut beans in an auger-like fashion to burrs. The burrs are configured and arranged for grinding the beans to a desired grind size and for delivering the same to the collection receptacle, such that the beans make a single pass through a grinding path comprising the blades and the burrs.

18 Claims, 7 Drawing Sheets

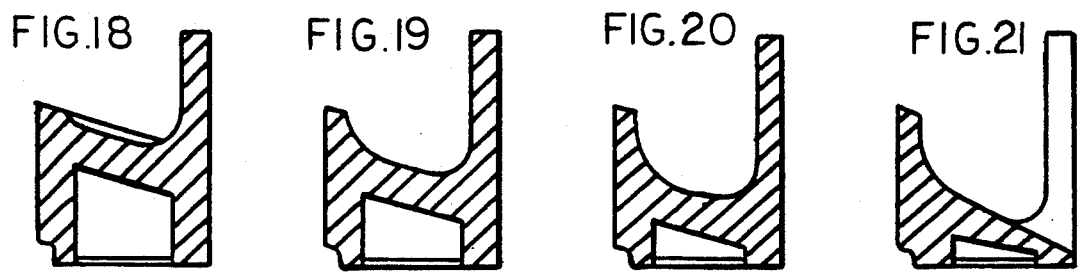
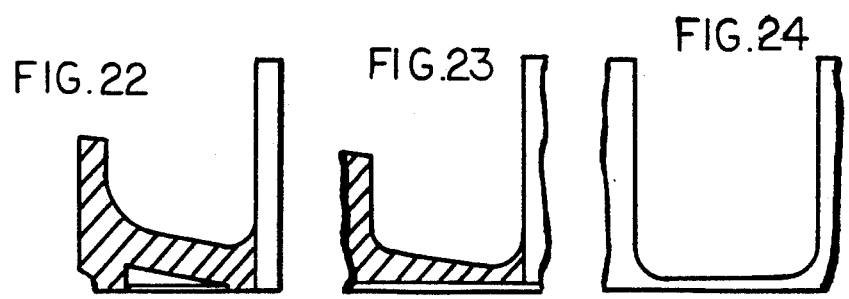
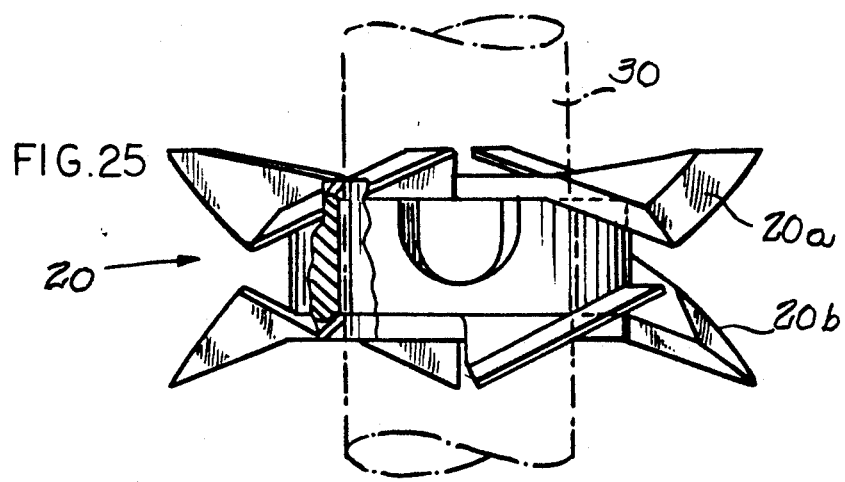
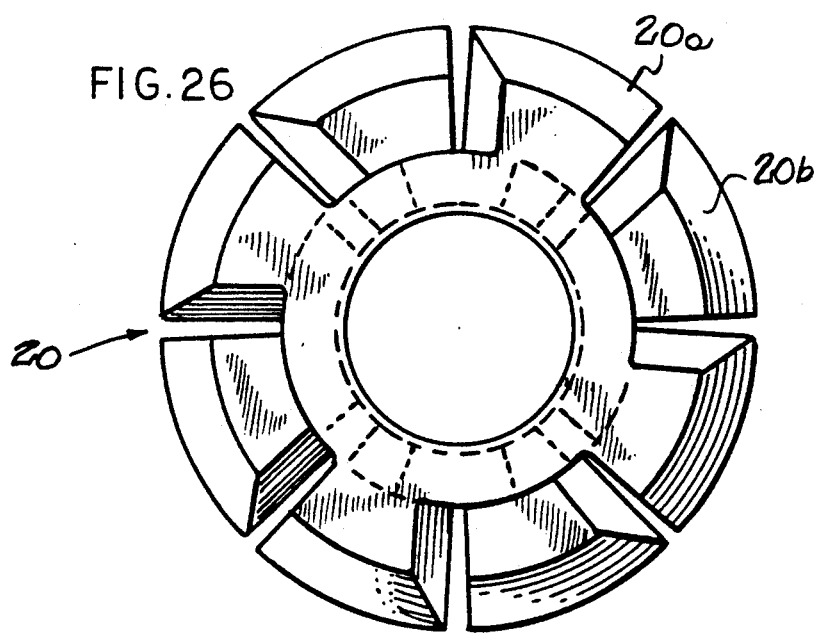

COFFEE GRINDER

BACKGROUND OF THE INVENTION

This application is directed to improvements in coffee grinders. More particularly, this application is directed to improvements for coffee grinders for the home market.

Generally speaking, coffee grinders for the home must be relatively simple and reliable in operation, and yet durable and reasonably maintenance free. These goals must be accomplished within strict budgetary considerations, making it possible to design, assemble and market a coffee grinder at a price suitable for home use.

Generally speaking, a number of problems must be overcome in properly grinding coffee. Initially, different types of coffee and different types of coffee brewing methods require different grind sizes of the coffee. While commercially ground coffee is available in several grinds, many consumers prefer the flavor of freshly ground beans. Moreover, many coffee lovers mix a number of different beans to obtain a desired flavor blend.

Coffee lovers know that coffee begins to lose flavor and aroma as soon as it is ground. In fact, roasted bean coffee has a shelf life approximately much longer than preground coffee.

In general, the finer the grind of the coffee, the greater the surface area exposed to water during brewing and the more rapid the rate of flavor extraction. A coarse grind exposes less surface and is therefore more appropriate for longer brewing cycles. On the other hand, a grind too fine tends to result in a more bitter flavor. Generally speaking then, the correct coffee grind is one that permits the water to pass through the coffee grounds in the correct amount of time with the minimum amount of sediment.

The grinding of coffee requires a grinding apparatus which has sufficient power to fully grind the coffee to desired size, and yet does not bruise, burn or abrade the coffee bean. That is, the coffee bean should ideally pass through the grinder relatively rapidly, and be quickly and efficiently ground to the desired finished size. Unfortunately, many coffee grinding machines presently on the market for home use fail to achieve these ends reliably.

Many of these home coffee grinders utilize blades or so-called burrs to grind the coffee. However, most of these machines utilize a rotary action of the blades or burrs and, in order to apply sufficient force to the beans, utilize relatively high rotational speeds. For example, typical home machines on the market utilize rotational motor speeds of anywhere from 20,000 rpm to as high as 29,500 rpm. These rotational speeds, together with the types and sizes of blades and/or burrs used in these machines, produce an effective blade or burr speed (surface feet per minute) of anywhere from on the order of 9,200 sfpm to as high as 17,900 sfpm. A few machines do utilize lower motor shaft speeds and/or effective blade or other cutting surface speeds. However, we have found none of the prior home market grinders able to achieve grinds to CBC (Coffee Brewing Council) specifications.

The relatively high rotational speeds of most grinders tend to crush and abrade the beans in such a way that considerable heat builds up and burning of the beans occurs during grinding. Such heat build-up and subsequent burning of the beans can adversely affect their flavor.

As an additional matter, many home market machines are difficult to effectively clean, and allow excessive chaff and ground coffee to build up in the grinding areas and mechanisms. This chaff and ground coffee can, of course, deteriorate and become stale over time, and thus compromise the flavor of freshly ground coffee being processed through the grinder.

OBJECTS AND SUMMARY OF THE INVENTION

Accordingly, it is an object of the present invention to provide a novel and improved coffee grinder which overcomes the problems noted hereinabove, and yet is capable of being economically produced for the home market.

A related object is to make a coffee grinder in accordance with the foregoing which is highly reliable in operation and has a long and relatively maintenance-free service life.

A coffee grinder in accordance with the invention comprises bin means for holding a supply of coffee beans to be ground; grinding means for receiving the beans from the bin means and grinding them to a desired grind size, and collection receptacle means for receiving the ground coffee from said grinding means; wherein said grinding means comprises blade means for cutting the beans to a relatively uniform size; said blade means being configured and located for feeding the cut beans in an auger-like fashion to the burr means; said burr means including means for grinding the beans to a desired grind size and for delivering the same to said collection receptacle means, such that said beans make a single pass through a grinding path comprising said blade means and said burr means.

BRIEF DESCRIPTION OF THE DRAWINGS

The features of the present invention which are believed to be novel are set forth with particularity in the appended claims. The organization and manner of the operation of the invention, together with further objects and advantages thereof may best be understood by reference to the following description, taken in connection with the accompanying drawing in which like reference numerals identify like elements, and in which:

FIGS. 18-24 are respective partial sectional views taken along the corresponding sectional lines indicated on FIG. 15;

FIG. 25 is a side elevation of a blade assembly of the coffee grinder of the invention;

FIG. 26 is a plan view of the blade assembly of FIG. 25;

DETAILED DESCRIPTION OF THE ILLUSTRATED EMBODIMENT

Figure 2:
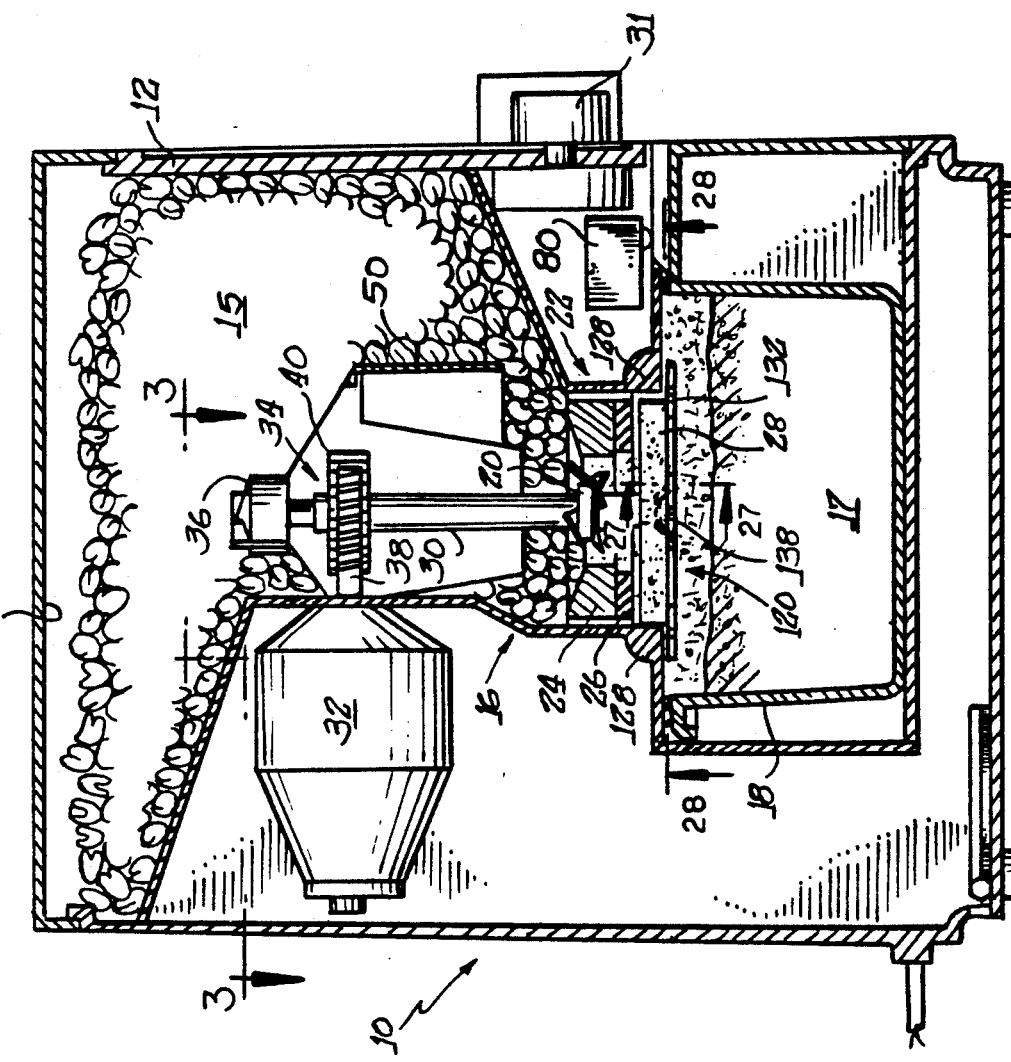
FIG. 2 is an enlarged, sectional view taken generally in the plane of the line 2—2 of FIG. 1.
Figure 1:
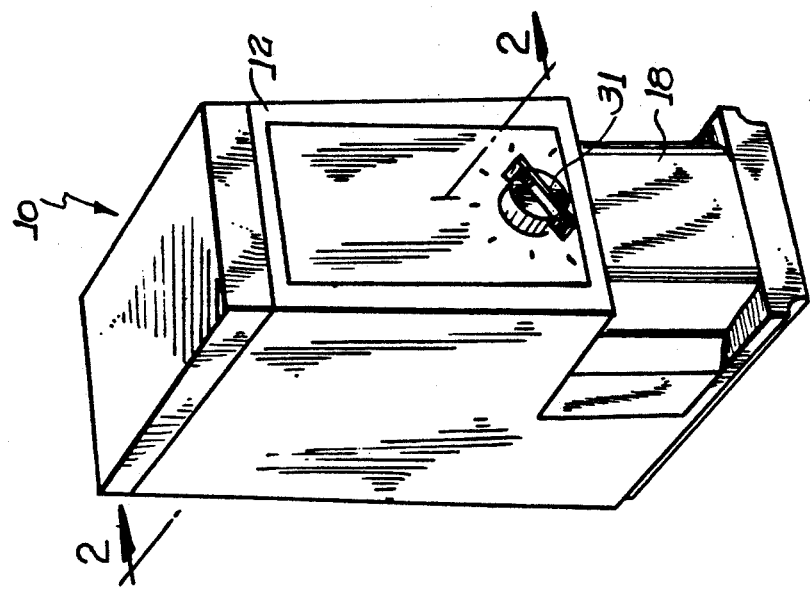
FIG. 1 is a perspective view of a coffee grinder in accordance with the invention.

Referring now to the drawings and initially to FIGS. 1-4, a coffee grinder in accordance with the invention is designated generally by the reference numeral 10. The coffee grinder 10 includes a case or housing 12 within which is defined a bin or hopper 14 for holding a supply of coffee beans 15 to be ground. A grinding means or assembly designated generally by reference numeral 16 receives the beans 15 from the bin 14, grinds the beans to a desired size, and delivers the ground coffee 17 to a collection receptacle 18.

In accordance with the invention, the grinding means or assembly includes blade means 20 for initially grinding or cutting the beans to a relatively uniform intermediate size. The blade means are configured and located within a grinder for feeding the cut beans in an auger-like fashion to a burr assembly or burr means 22 therebelow. The burr means or assembly 22 is configured for grinding the beans to the desired grind size and for delivering the same to the collection receptacle 18. The arrangement of the bin 14, blades 20, burrs 22 and receptacle 18 is such that the coffee beans make a single pass through a grinding path comprising both the blades and the burrs as they are ground to desired size for delivery to the receptacle 18.

Additional metering means in the form of a generally annular metering ring 24 is located in surrounding relation to the blades 20 for metering and directing the beans into the blades 20. The burr means 22 will be seen to comprise a generally annular stationary burr member 26 and a similar, generally rotatable annular rotatable burr 28. The blades 20 and rotatable burr 28 are carried upon a common shaft 30 which is operatively coupled to a motor 32 for rotation through a gear reduction drive 34. The stationary burr and rotatable burr are formed such that the coffee is ground therebetween and discharged into the collection receptacle substantially about a 360° circumference; that is, about the outer circumference of the rotatable burr 28. The mounting of the blades 20 and rotatable burr 28 to shaft 30 also serves to substantially center the blades 20 relative to both the rotatable and stationary burrs, and at a location which is axially spaced somewhat thereabove.

The metering ring 24 is also generally annular in form having a similar inner diameter to the respective burrs 26, 28 such that the blades 20 are also substantially centered relative to the metering ring 24, and such that all of these elements are substantially coaxially aligned relative to the axis of the shaft 30. As will be more fully described presently, a burr adjustment means 36 is also provided for adjusting the axial spacing or gap between the rotatable burr 28 and stationary burr 26 to vary the grind size of the coffee obtained thereby as desired.

In the illustrated embodiment, the gear reduction means 34 comprises a worm gear 38 and a mating gear 40. As illustrated, the worm gear is mounted to be rotated by the shaft of the motor 32 and the mating gear is nonrotatably affixed to the drive shaft 30. A control such as an adjustable timer 31 may be used to operate the motor 32.

Figure 4:
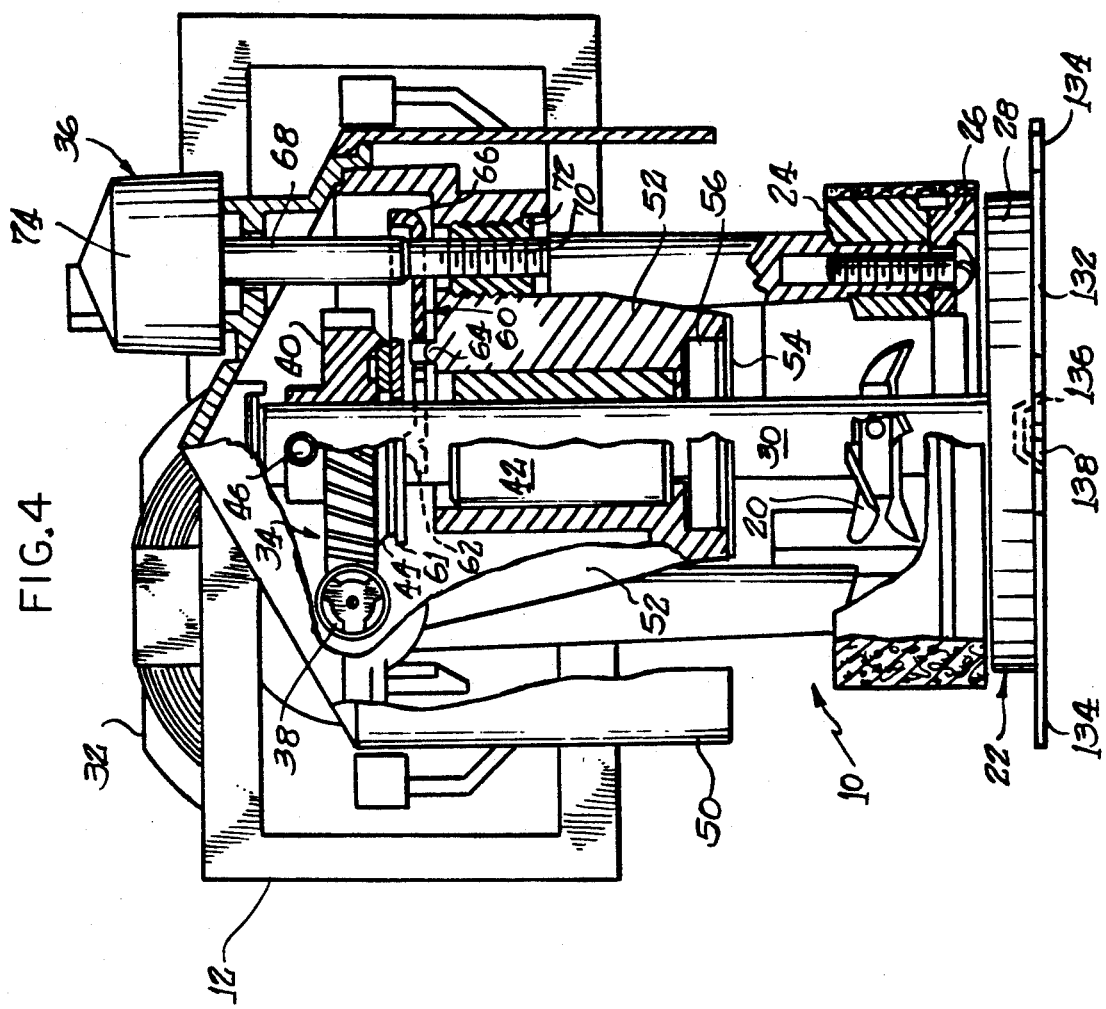
FIG. 4 is a side elevational view of the coffee grinder of FIGS. 1-3, partially broken away and partially in section.
Figure 3:
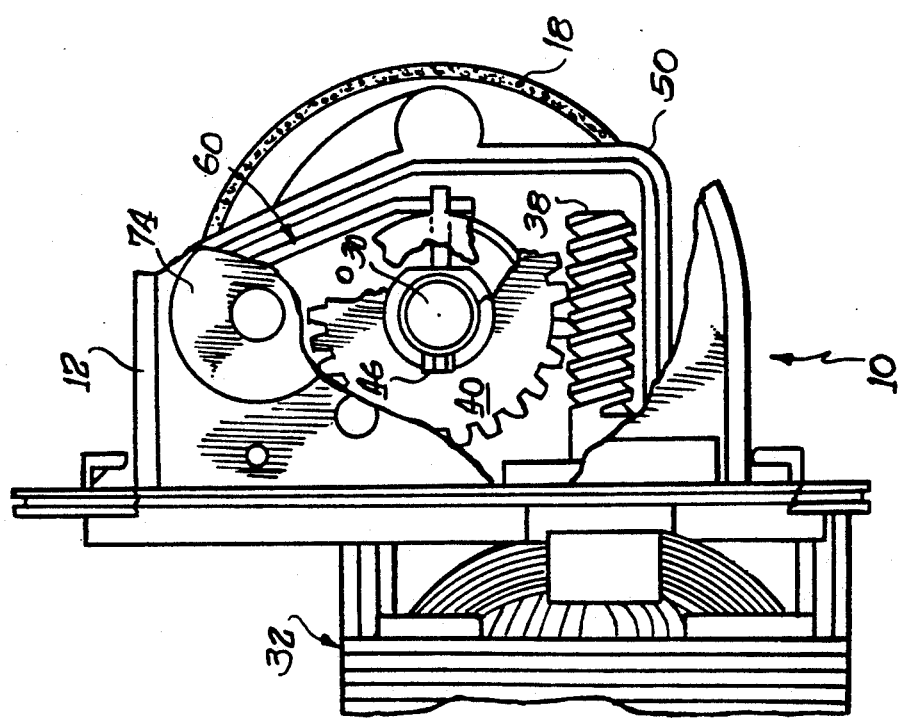
FIG. 3 is a partial sectional view taken generally along the line 3-3 of FIG. 2.
Figure 5:
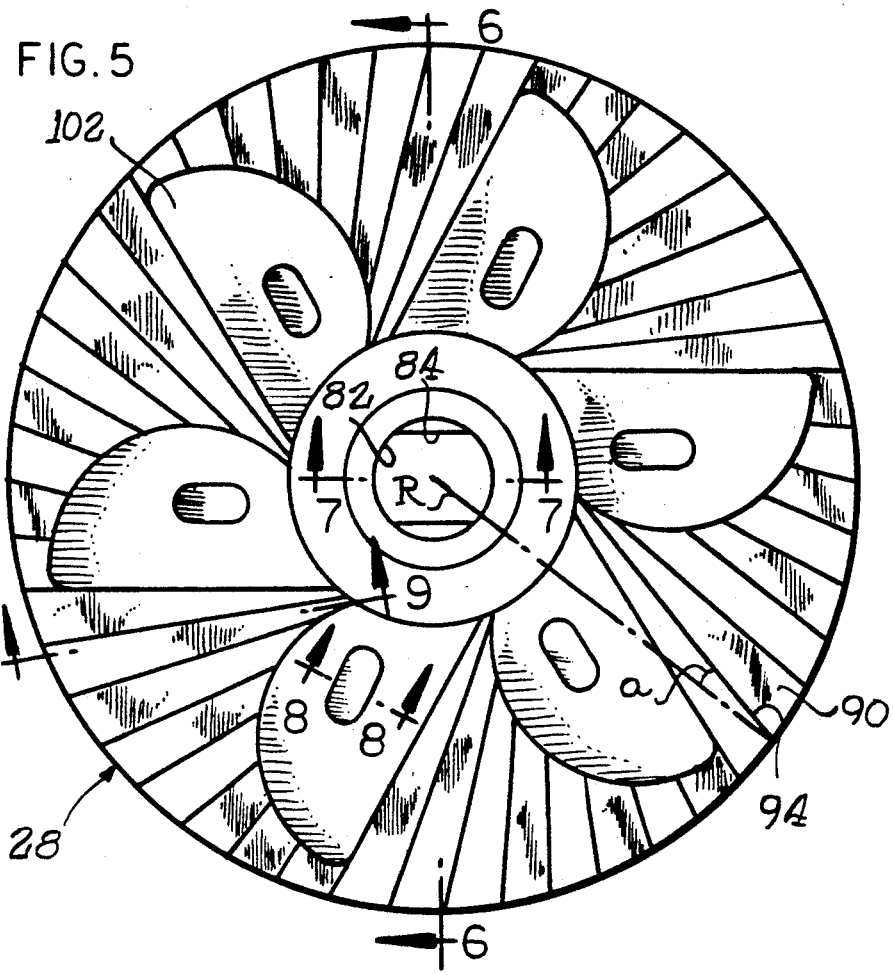
FIG. 5 is a plan view of a rotatable burr member of the coffee grinder of the invention.
Figure 6:
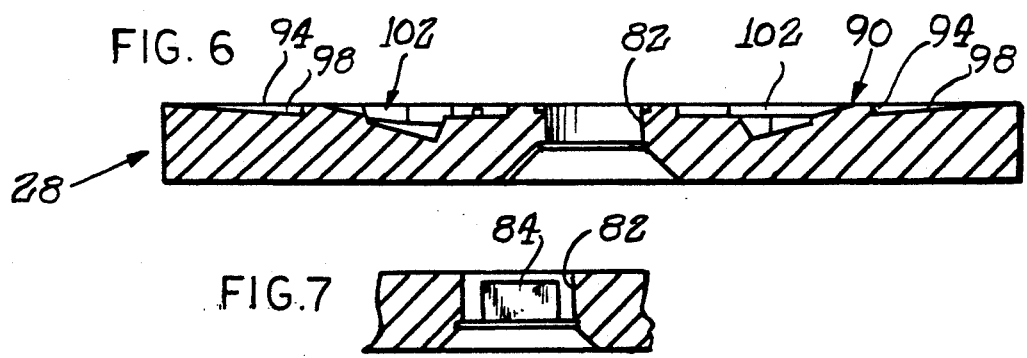
FIG. 6 is a sectional view taken generally along the line 6—6 of FIG. 5.
Figure 7:
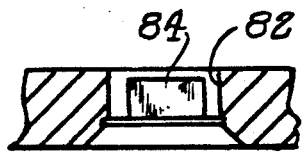
FIGS. 7, 8 and 9 are partial sectional views taken generally along the corresponding lines 7—7, 8—8 and 9—9 of FIG. 5.
Figure 8:
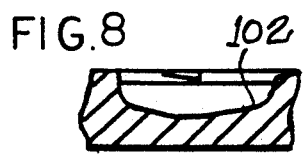

As best viewed in FIG. 4, the drive shaft 30 is mounted to a series of bearings including an elongate axial bearing 42 about a mid-portion thereof, and a thrust bearing 44 about an upper portion thereof which supports the gear 40, which is in turn pinned to the shaft 30 by a spring pin 46. A bean shield or shroud member 50 circumferentially surrounds and directs beans around the assembly comprising the shaft and gear reduction drive, so as to direct beans downwardly around these components and into the metering ring 24. An internal housing component or member 52 surroundingly engages and supports the bearing 42 and terminates in a sealing arrangement comprising an annular washer 54 and a sealing felt 56 which seals off the drive assembly from the bean receptacle and grinding areas of the apparatus.

In the illustrated embodiment, the burr adjusting means for regulating the size of the gap between the burrs 26 and 28 comprises means for axially adjusting the position of the thrust bearing 44. This assembly includes an elongate lever 60 which has one end thereof split in a yoke-like fashion for engaging an eared washer 61 which in turn engages the bearing 44 from below, to either side of the shaft 30 as indicated by reference numeral 62. A mid point of the lever is fulcrumed on the housing portion 52 as indicated generally at reference numeral 64. An opposite end 66 of the lever is coupled to an elongate threaded adjustment shaft 68 which is threaded for bidirectional axial movement along an axis generally parallel to the axis of the drive shaft 30. The threaded shaft 68 has an externally threaded lower end 70 which extends into a similarly threaded support 72 to accomplish generally bidirectional axial movement of the shaft 68 when it is rotated by an outwardly extending control knob 74, which is nonrotatably affixed to the shaft 68.

Hence, the gap between the burrs 26 and 28 can be adjusted within predetermined limits by rotation of the knob 74 which causes bidirectional movement of shaft 68, fulcruming of lever 60 and corresponding axial movement of the thrust bearing 44 which carries with it the gear 40 and shaft 30.

In connection with operation of the motor 32, an additional sensing means, such as a small electrical switch 80 is provided for detecting when the collection receptacle 18 has been removed from the grinder housing 12. The switch 80 is wired in circuit for preventing operation of the motor 32 when the collection receptacle 18 is removed.

Referring now to the remaining drawings, further details of the rotary and stationary burrs 28, 26, of the guide ring 24 and of the blades 20 are illustrated. Referring initially to FIGS. 5-9, it will be seen that the rotary burr 28 is a substantially annular, disc-like member having a central through opening 82 for mounting an end part of the drive shaft 30 thereto. Preferably this opening 82 has one or more flats 84 for securing the shaft thereto in nonrotatable fashion.

Referring now also to FIGS. 10-14. The stationary burr 26 is also a generally annular, disc-like member having a central through opening 86 through which shaft 30 freely extends. Both the rotatable and stationary burrs have facing, substantially annular coffee grinding faces, 90, 92 which are formed in a similar and complementary fashion as illustrated in respective FIGS. 5-9 and 10-14. In particular, each of these faces 90, 92 has a plurality of elongate teeth 94, 96 which are formed at least partially thereacross, and which extend across the annular face at an angle a relative to its radius R, r. In the illustrated embodiment, the angle of each of these teeth 94, 96 to the radius across its respective annular face is substantially on the order of 14°.

It will be noted that when the faces 90 and 92 are brought together in face-to-face relation as illustrated in FIGS. 2 and 4, for example, that the respective teeth and grooves will be angled oppositely, such that a scissors-like cutting action is achieved therebetween.

Figure 9:
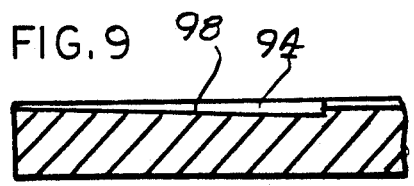
Figure 10:
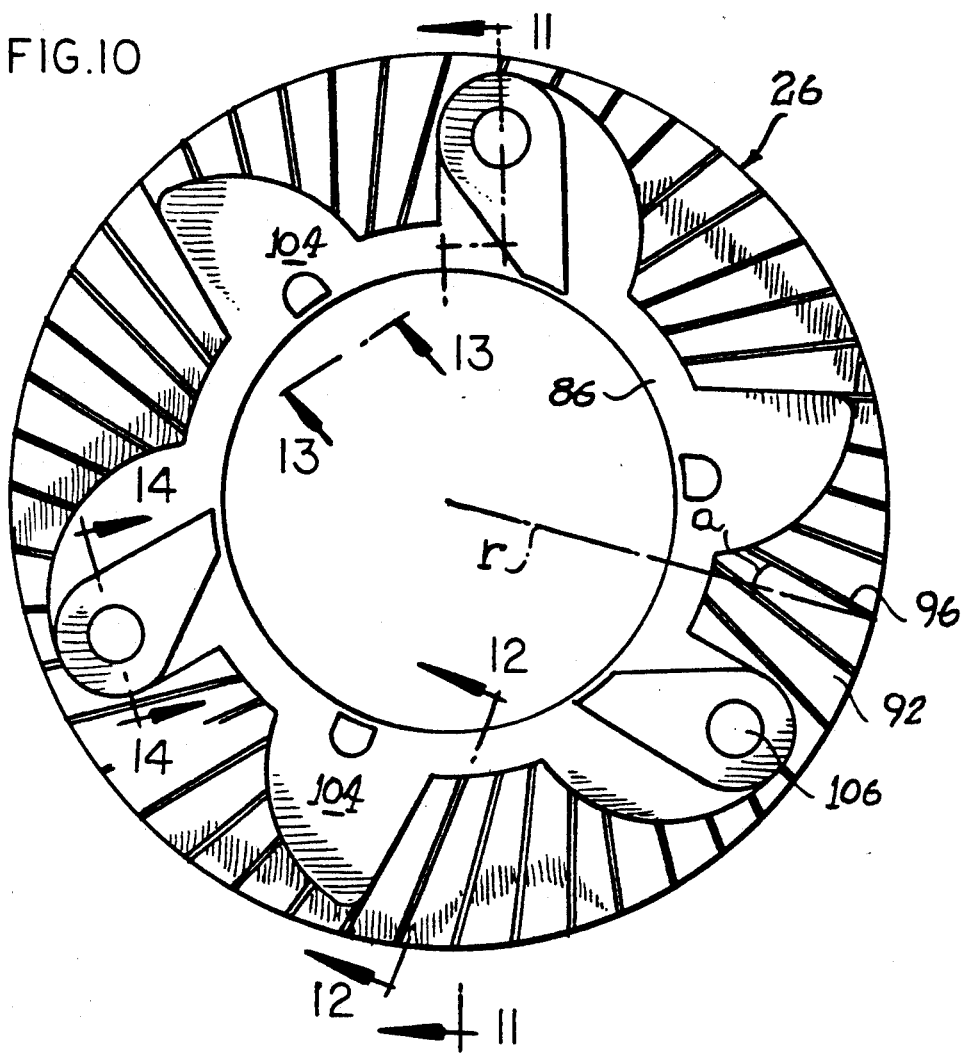
FIG. 10 is a plan view of a stationary burr member of the grinder of the invention.
Figure 11:
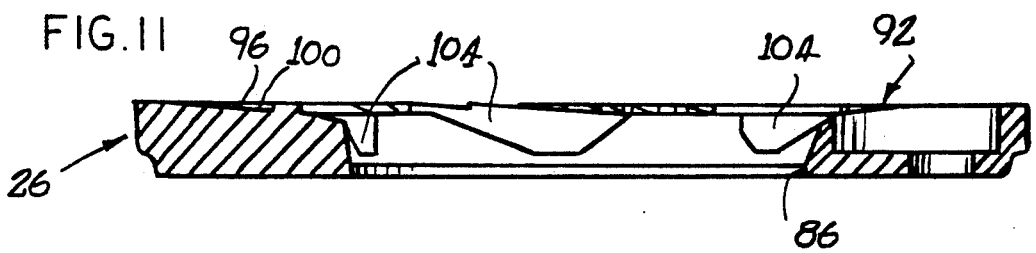
FIG. 11 is a sectional view taken generally along the line 11—11 of FIG. 10.
Figure 12:
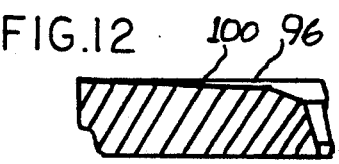
FIGS. 12, 13 and 14 are partial sectional views taken generally along lines 12—12, 13—13 and 14—14 of FIG. 10.
Figure 13:
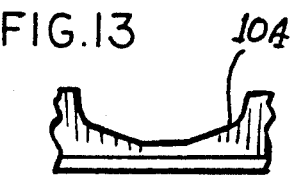
Figure 14:
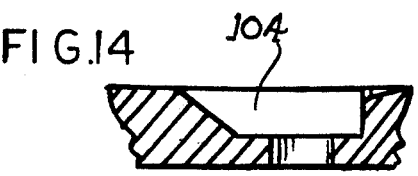
Figure 15:
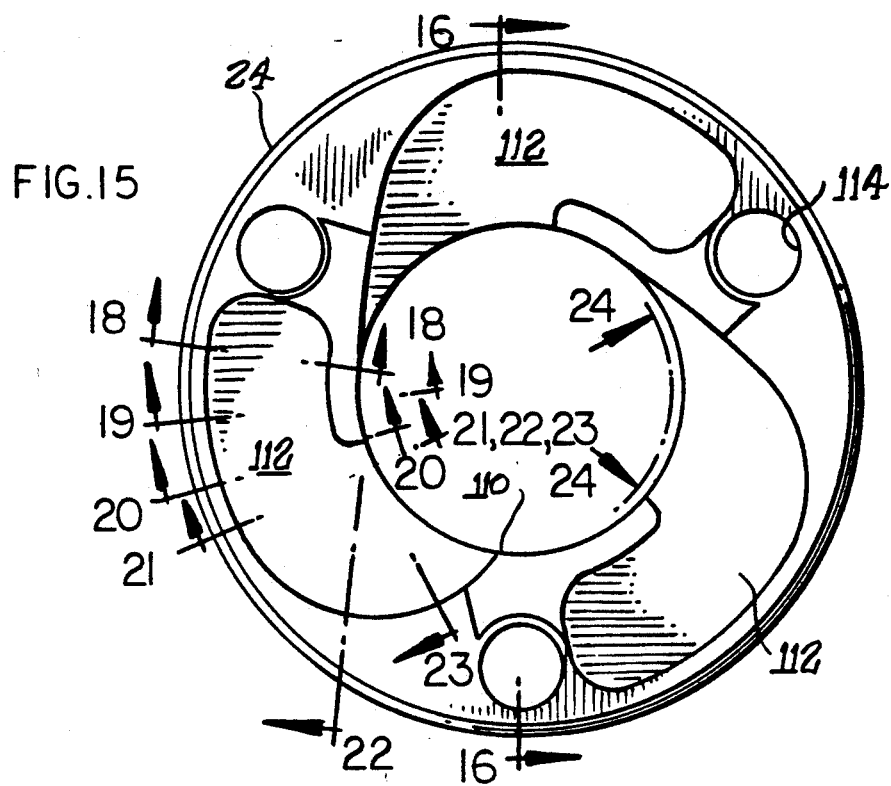
FIG. 15 is a top plan view of a metering member of the coffee grinder of the invention.
Figure 16:
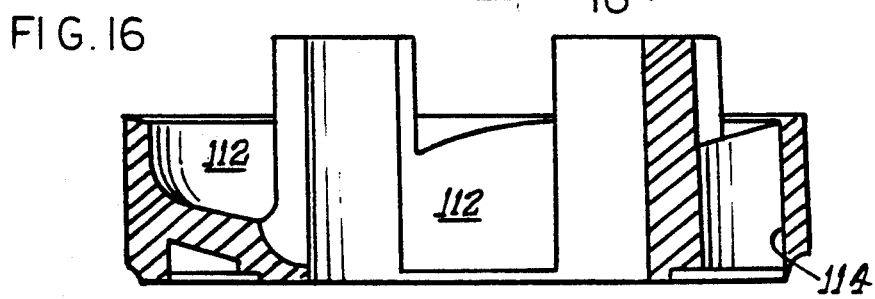
FIG. 16 is a sectional view taken generally along the line 16—16 of FIG. 15.
Figure 17:
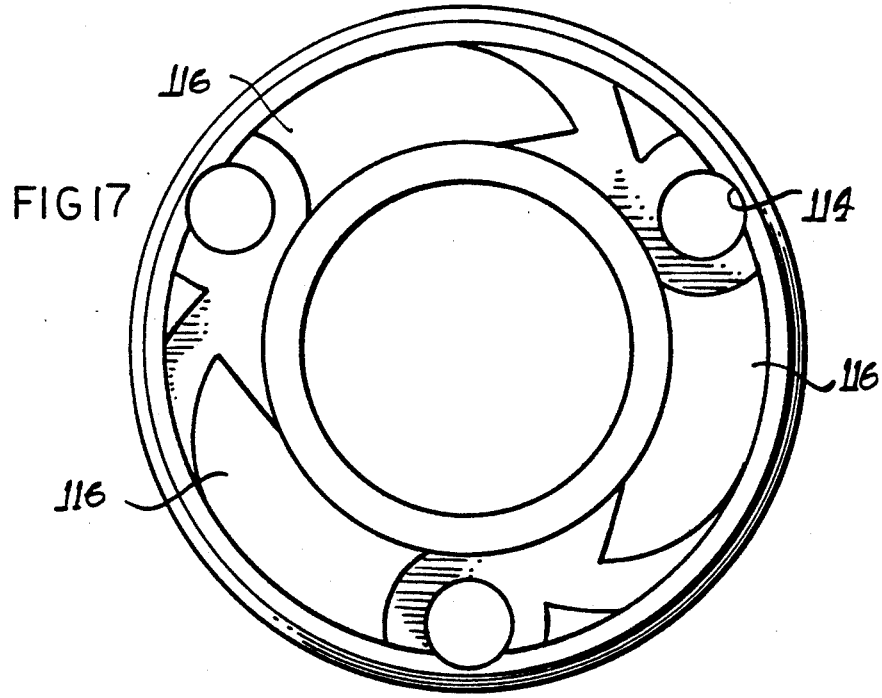
FIG. 17 is a bottom plan view of the metering member of FIGS. 15 and 16.

Moreover, as best viewed in FIGS. 9 and 12, each of these teeth defines a corresponding groove 98, 100 which grooves generally increase in depth as they extend inwardly from outer peripheries of respective annular faces 90, 92 toward the centers thereof. Advantageously, we have found that the increasing depth of the grooves 98, 100 tends to force the beans radially outwardly as the cutting progresses and as their size gradually decreases from the size at which they are introduced to the burrs to the desired finished grind size.

The burrs also include a plurality of recesses or pockets 102, 104 which are generally blade-like in plan. These pockets 102, 104 are also preferably shaped, located and configured to receive the beans as initially cut by the blades 20 and to uniformly distribute and urge the beans outwardly and into the areas between the teeth and grooves for the final cutting or grinding thereof to their desired final size. Stationary burr 26 also defines respective through openings 106 for receiving fasteners for mounting the same in stationary fashion to the grinder structure. Preferably each of the burrs 26, 28 is a chrome-type tool steel.

Referring now to FIGS. 15-24, further details of the metering ring 24 are illustrated. It will be seen that the ring 24 comprises a generally annular body having a central through opening 110 within which the blades 20 are located in the assembled grinder. Generally speaking, the depth of opening 110 is such that the blades will be located fully therewithin (see FIGS. 2 and 4) and such that the beans will be fed to the blades exclusively through a plurality of downwardly and inwardly sloping guide trough or chute-like areas 112 formed in the metering ring 24. These areas 112 open inwardly and downwardly of the metering ring as best viewed in FIGS. 15 and 16. Three through mounting apertures 114 are also formed in the metering ring. At the bottom surface of the metering ring shown in FIG. 17, additional recesses 116 are illustrated. These recesses 116 extend generally in a circumferential direction and have slopes corresponding to those of the surfaces 112, and are primarily a result of the manufacturing process for forming these sloping areas 112 within the metering ring 24.

Referring to FIGS. 25 and 26, the blades 20 will be seen to comprise substantially identical and oppositely facing blade members or portions 20a and 20b. As mentioned, these blade portions are configured such that the blades initially receive and partially grind or reduce the coffee beans fed thereto from the metering ring 24, and feed these initially ground or reduced beans in a augur-like fashion to the final cutting burrs 26, 28. It will be noted that as viewed in the top plan views of the blades 20 and of the rotatable burr 28, illustrated respectively in FIGS. 26 and 5, the rotation thereof by the drive shaft 30 will be in a counterclockwise direction. Preferably, the motor and gear reduction drive are arranged to operate the drive shaft for rotating the blades and rotatable burr at a speed of substantially on the order of 2000 rpm. The motor speed is on the order of 19000 rpm and the gear ratio about 9.66 in the exemplary embodiment described herein.

Referring now to FIGS. 27 through 30, in accordance with a preferred feature of the invention, a dechaffing means or assembly 120 is provided (see also FIGS. 2 and 4). This dechaffing assembly 120 generally prevents chaff from the grinding operation from entering and possibly clogging portions of the grinder apparatus. The dechaffing assembly thereby essentially dechaffs the apparatus and causes the chaff to remain with the ground beans as the same travel from the burr assembly into the receptacle 18. We have found that absent such a dechaffing means, there is a tendency for the chaff to develop a static charge and migrate into various areas of the apparatus in an undesirable manner.

Figure 27:
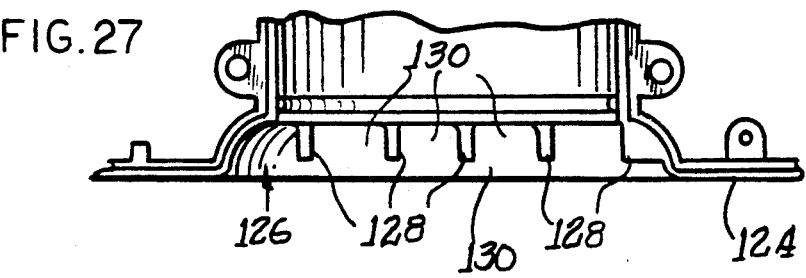
FIG. 27 is an enlarged side elevation illustrating one half of two substantially identical shroud halves which surround the grinding assembly and a dechaffing structure.
Figure 28:
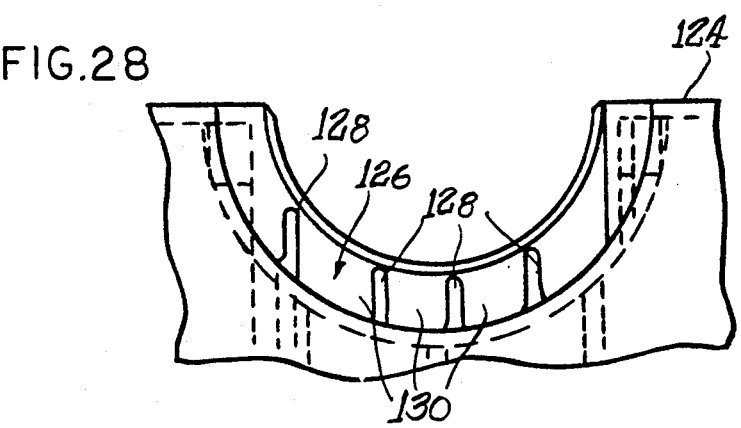
FIG. 28 is a plan view of the structure shown in FIG. 27.

Referring now more particularly to FIGS. 2, 4 and 27-30, the dechaffing means 129 includes a shroud member or portion 122 which is preferably formed as a pair of substantially identical shroud halves, one such half 124 being illustrated in FIGS. 27 and 28. The shroud 122 defines a generally annular open area 126 which generally circumferentially surrounds the grinding assembly and in particular the rotatable burr 28. This annular open area or volume 126 generally permits the ground beans to exit circumferentially or peripherally of the rotatable burr 28 and enter the collection receptacle 18 therebelow. In order to assure that the chaff remains with the ground beans, the shroud 124 is provided with a plurality of small divider wall members 128 which extend into the area 126 and divide it into a number of separate zones 130.

Figure 29:
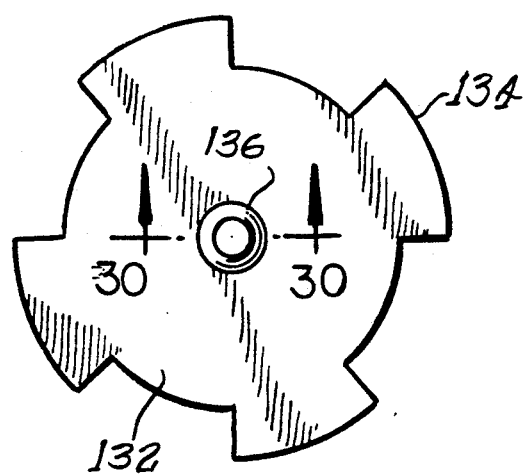
FIG. 29 is a plan view of a dechaffing blade member.
Figure 30:
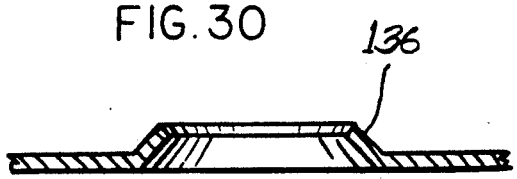
FIG. 30 is a partial sectional view taken generally along the line 30—30 of FIG. 29.

Referring also to FIGS. 29 and 30, a cooperative dechaffing blade member 132 is mounted, as best viewed in FIG. 4, to a bottom surface of the rotatable burr 28 surface of the rotatable burr 28. The dechaffing blade 132 is a generally circular disk-like member having a plurality of projecting angularly spaced segments 134. These projecting segments 134 are generally equiangularly spaced and of equal angular extent. The angular extent of the projections 134 is such that they tend to cover one or more of the zones 130 as the blade rotates relative to the shroud 124 thus momentarily stopping or preventing flow of the beans and chaff therethrough.

The dechaffing blade will be seen to include a somewhat recessed central area or portion 136 to facilitate mounting of the same directly against the facing surface of the rotatable burr 28 and for in turn mounting both the rotatable burr 28 and the dechaffing blade 136 to the shaft 30, as best viewed in FIGS. 2 and 4.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A coffee grinder comprising: bin means for holding a supply of coffee beans to be ground; grinding means for receiving said beans from said bin means and grinding the beans to a desired grind size, and collection receptacle means for receiving the ground coffee from said grinding means; wherein said grinding means comprises blade means and burr means, said blade means being configured and located for cutting the beans to a predetermined size and for feeding the cut beans in an auger-like fashion to said burr means; said burr means including means for grinding the cut beans to a desired grind size and for delivering ground beans to said collection receptacle means, such that said beans made a single pass through a grinding path comprising said blade means and said burr means; wherein said burr means comprise a rotatable burr and a stationary burr spaced apart therefrom to define a gap therebetween; wherein said rotatable burr and said stationary burr are substantially annular in form whereby the coffee is ground and discharged to said collection receptacle substantially about 360°; wherein said rotatable and stationary burrs have facing, substantially annular coffee-grinding faces defining radii, and wherein said faces contain a plurality of elongate teeth extending at least partially across said annular faces at an angle to the radii thereof, the teeth of said stationary burr extending at an angle opposite the teeth of said rotatable burr when said annular faces are in face-to-face relation for achieving a scissors-like action therebetween, and further including dechaffing means located adjacent said burr means for substantially retaining chaff with the ground beans and for substantially preventing chaff from accumulating in other portions of said coffee grinder.

2. A coffee grinder according to claim 1 and further including metering means for directing said beans through said blade means and said burr means.

3. A coffee grinder according to claim 1 and further including burr adjustment means for adjusting the size of said gap between said rotatable burr and said stationary burr to vary the grind size as desired.

4. Apparatus according to claim 1 wherein said dechaffing means comprises a shroud member surrounding said burr means and having a generally annular circumferential open area for delivering ground beans generally in a radially outward direction from about a peripheray of said burr means; a plurality of divider members projecting into said annular area for dividing the same into a plurality of separate zones, and a generally circular disk-like dechaffing member having a plurality of radially outwardly projecting portions for alternately blocking and opening said plurality of zones defined by said divider means.

5. A coffee grinder according to claim 1 wherein said blade means is substantially centered relative to the rotatable and stationary burrs, and is spaced axially thereabove.

6. A coffee grinder according to claim 5 and further including metering means comprising a substantially annular metering ring located in surrounding relation to said blade means and generally coaxial with and in alignment with said annular rotatable and stationary burrs, and spaced thereabove.

7. A coffee grinder according to claim 1 and further including drive means for rotating said blade means and said rotatable burr means and comprising a motor and a gear reduction drive operatively coupled intermediate said motor and both said blade means and said rotatable burr means.

8. A coffee grinder according to claim 7 and further including a common drive shaft mounting both said blade means and said rotatable burr for rotation in unison and wherein said gear reduction means comprises a worm gear coupled to said motor, and a mating gear coupled to said drive shaft.

9. A coffee grinder according to claim 7 and further including sensor means for sensing the absence of said collection receptacle and for preventing operation of said motor when said collection receptacle is absent.

10. A grinding apparatus for a coffee grinder comprising: burr means, blade means for cutting coffee beans to a predetermined size; said blade means being configured for feeding the cut beans in an auger-like fashion to said burr means; and burr means including means for grinding the beans to a desired grind size and for delivering ground beans directly to a collection receptacle, such that said beans make a single pass through a grinding path comprising said blade means and said burr means; wherein said burr means comprise a rotatable burr and a stationary burr spaced apart therefrom to define a gap therebetween; wherein said rotatable burr and said stationary burr and substantially annular in form whereby the coffee is ground and discharged to said collection receptacle substantially about 360°; and wherein said rotatable and stationary burrs have facing, substantially annular coffee-grinding faces defining radii, and wherein said faces contain a plurality of elongate teeth extending at least partially across said annular faces at an angle to the radii thereof, the teeth of said stationary burr extending at an angle opposite the teeth of said rotatable burr when said faces are in face-to-face alignment for achieving a scissors-like action therebetween, and drive means for rotating said blade means and said rotatable burr means and comprising a motor and a gear reduction drive operatively coupled intermediate said motor and both said blade means and said rotatable burr means, and a common drive shaft mounting both said blade means and said rotatable burr for rotation in unison and wherein said gear reduction means comprises a worm gear coupled to said motor, and a mating gear coupled to said drive shaft, and burr adjusting means for regulating the size of the gap between the rotatable and stationary burrs to vary the grind size as desired, said burr adjusting means comprising bearing means mounting said drive shaft for bidirectional axial movement, lever means for adjusting the axial height of said bearing means to obtain the desired gap, and control means for bidirectionally moving said lever means to adjust said shaft.

11. Apparatus according to claim 10 and further including metering means for directing said beans through said blade means and said burr means.

12. Apparatus according to claim 10 and further including burr adjustment means for adjusting the size of said gap between said rotatable burr and said stationary burr to vary the grind size as desired.

13. Apparatus according to claim 10 wherein said control means comprises an elongate threaded shaft mounted for bidirectional threaded movement along an axis generally transverse of said lever means, and yoke means coupling one end of said lever to said control shaft, an opposite end of said lever being positioned to bear against said bearing means, and fulcrum means for said lever intermediate said ends thereof.

14. Apparatus according to claim 10 wherein said blade means is substantially centered relative to the rotatable and stationary burrs, and is spaced axially thereabove.

15. Apparatus according to claim 14 and further including metering means comprising a substantially annular metering ring located in surrounding relation to said blade means and generally coaxial with and in alignment with said annular rotatable and stationary burrs, and spaced thereabove.

16. A coffee grinder comprising: bin means for holding a supply of coffee beans to be ground; grinding means for receiving said beans from said bin means and grinding the beans to a desired grind size, and collection receptacle means for receiving the ground coffee from said grinding means; wherein said grinding means comprises blade means and burr means, said blade means being configured and located for cutting the beans to a predetermined size and for feeding the cut beans in an auger-like fashion to said burr means; said burr means including means for grinding the cut beans to a desired grind size and for delivering ground beans to said collection receptacle means, such that said beans made a single pass through a grinding path comprising said blade means and said burr means; wherein said burr means comprise a rotatable burr and a stationary burr spaced apart therefrom to define a gap therebetween; wherein said rotatable burr and said stationary burr are substantially annular in form whereby the coffee is ground and discharged to said collection receptacle substantially about 360°; wherein said rotatable and stationary burrs have facing, substantially annular coffee-grinding faces defining radii, and wherein said faces contain a plurality of elongate teeth extending at least partially across said annular faces at an angle to the radii thereof, the teeth of said stationary burr extending at an angle opposite the teeth of said rotatable burr when said annular faces are in face-to-face relation for achieving a scissors-like action therebetween, and drive means for rotating said blade means and said rotatable burr means and comprising a motor and a gear reduction drive operatively coupled intermediate said motor and both said blade means and said rotatable burr means, and a common drive shaft mounting both said blade means and said rotatable burr for rotation in unison and wherein said gear reduction means comprises a worm gear coupled to said motor, and a mating gear coupled to said drive shaft, and burr adjusting means for regulating the size of the gap between the rotatable and stationary burrs to vary the grind size as desired, said burr adjusting means comprising bearing means mounting said drive shaft for bidirectional axial movement, lever means for adjusting the axial height of said bearing means to obtain the desired gap, and control means for bidirectionally moving said lever means to adjust said shaft.

17. A coffee grinder according to claim 16 wherein said control means comprises an elongate threaded shaft mounted for bidirectional threaded movement along an axis generally transverse to said lever means, and yoke means coupling one end of said lever to said control shaft, an opposite end of said lever being positioned to bear against said bearing means, and fulcrum means for said lever intermediate said ends thereof.

18. A coffee grinder comprising: bin means for holding a supply of coffee beans to be ground; grinding means for receiving said beans from said bin means and grinding the beans to a desired grind size, and collection receptacle means for receiving the ground coffee from said grinding means; wherein said grinding means comprises blade means and burr means, said blade means being configured and located for cutting the beans to a predetermined size and for feeding the cut beans in an auger-like fashion to said burr means; said burr means including means for grinding the cut beans to a desired grind size and for delivering ground beans to said collection receptacle means, such that said beans make a single pass through a grinding path comprising said blade means and said burr means; and further including dechaffing means located adjacent said burr means for substantially retaining chaff with the ground beans and for substantially preventing chaff from accumulating in other portions of said coffee grinder; and wherein said dechaffing means comprises a shroud member surrounding said burr means and having a generally annular circumferential open area for delivering ground beans generally in a radially outward direction from about a periphery of said burr means; a plurality of divider members projecting into said annular area for dividing the same into a plurality of separate zones, and a generally circular disk-like dechaffing member mounted for rotation in unison with said blade means and having a plurality of radially outwardly projecting portions located and configured for alternately blocking and opening said plurality of zones defined by said divider means as said disk-like member rotates.

* * * * *